United States Patent Office 3,689,282
Patented Sept. 5, 1972

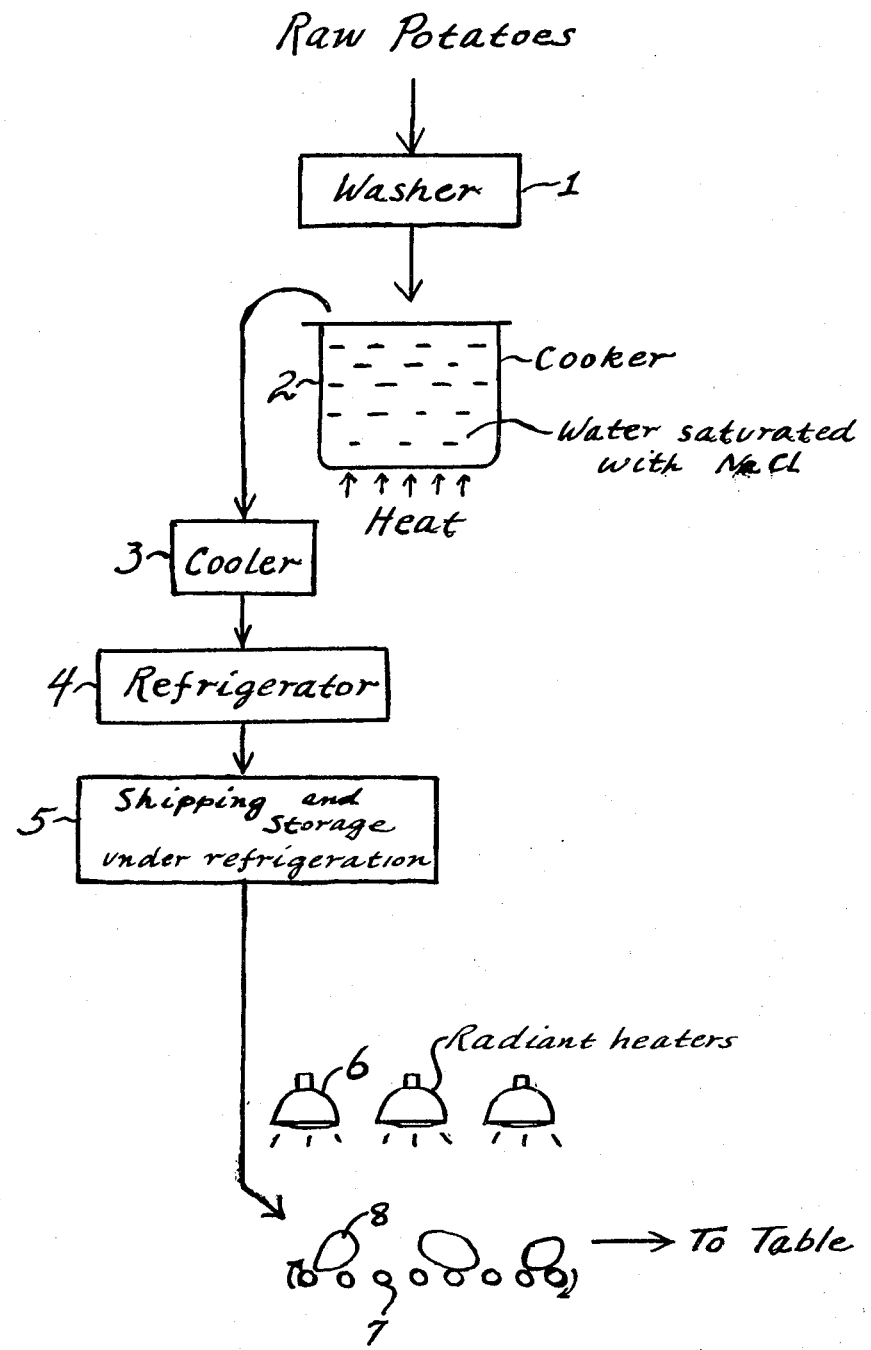

3,689,282
PREPARATION OF A BAKED POTATO PRODUCT
Bernard Feinberg, Berkeley, Calif., assignor to the United States of America as represented by the Secretary of Agriculture
Filed June 24, 1970, Ser. No. 49,411
Int. Cl. A23l 1/00
U.S. Cl. 99—100 P
2 Claims

ABSTRACT OF THE DISCLOSURE

Cooking raw whole unpeeled potatoes in a saturated aqueous solution of sodium chloride for a period long enough to gelatinize the starch and to dehydrate the tubers, cooling the cooked potatoes to about room temperature, and then chilling the cooled potatoes until they are ready to be prepared by heating them until the skin is crisp.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel potato products and methods for preparing them. Further objects of the invention will be evident from the following description wherein parts and percentages are by weight unless otherwise specified.

Many restaurants take pride in serving a baked potato with their featured meat dishes such as steaks and chops. Basically, these baked potatoes are prepared as they would be in the home. Raw whole potatoes are placed in a hot oven and maintained therein until they are properly baked. Although this time-honored method yields a completely satisfactory product, it involves certain disadvantages when applied in the food service industry. A primary consideration is that the baking process is slow. It requires about 1 hour for an 8-oz. potato and correspondingly longer for larger tubers. This extended baking time, in turn, means that baked potatoes cannot be prepared for individual orders; they must be prepared in advance. Accordingly, it is conventional practice to bake a sizeable lot of potatoes and then hold them in a warming oven or the like as individual orders are filled. With this system, those guests whose orders are filled shortly after the baked potatoes are prepared receive a tasty and flavorable dish; those who come in later are disappointed with a product that is stale and dried out.

A principal object of the invention is the provision of means for alleviating the problems outlined above. More particularly, the invention provides means by which food service establishments may prepare baked potatoes of good quality in a short period of time, indeed, short enough to fill individual orders whereby the old system of holding previously-baked products in a warming oven can be discarded.

The practice of the invention is next described in detail, having reference to the drawing which provides a flow-sheet of the process.

In a preliminary step in the process, whole potatoes are cleaned in water 1 to remove any dirt that may be clinging to the tubers.

Next, the tubers—still in whole, unpeeled condition—are cooked in a bath 2 of water saturated with salt (NaCl), and maintained at a temperature of 215–225° F. These high temperatures are possible, even though the cooking is conducted at atmospheric pressure, because of the high concentration of salt in solution. The potatoes are retained in the bath long enough to cook the tubers, that is, for the starch therein to be gelatinized, and also long enough for the weight of the tubers to be decreased (because of loss of moisture) by about 10–18%, preferably 12–18%.

The use of a saturated salt solution as the cooking medium is a critical item of the invention. With this medium a partial dehydration of the potatoes is achieved during the cooking. Such a result is, I believed, due to the high temperature of the brine solution, and an osmotic effect since the concentration of salt in the brine is higher than the original concentration of solubles in fresh potatoes. As a result, moisture from the potato tissue diffuses into the cooking medium.

It may be noted at this point that the aforementioned partial dehydration of the potatoes is a very desirable result as it gives them the mealy texture characteristic of baked potatoes. On the other hand, were the tubers to be cooked in plain water or in steam there would be no significant reduction in moisture content and the cooked products would have the characteristic waxy texture of boiled potatoes rather than the mealy texture of baked potatoes. It may also be mentioned that the cooking in saturated salt solution enables one to achieve the desired results (starch gelatinization and partial dehydration) without loosening or rupture on drying of the skins. This is, of course, a desirable result as the presence of the skin is a feature of baked potatoes and indeed regarded by many discriminating persons as the choice part of a baked potato.

Following the cooking step in bath 2, the cooked, partially-dehydrated potatoes are cooled to about room temperature in cooler 3 by exposure to cooled air or simply by standing under ambient conditions. The cooled tubers are then chilled in refrigerator 4 to a temperature of about 35° F.

The potatoes are now in a condition whereby they can be stored for reasonable times (for example, up to 15 days) witnout damage. Of course, during such storage they should be kept at refrigerator temperatures—about 35–40° F. Thus, the processing steps up to this point can be done in a centralized plant similar to those now used for processing chilled pre-peeled potatoes, and the product then shipped in suitable containers (plastic bags, for example) while under refrigeration to food service organizations. There, the products may be stored in the refrigerator until they are to be used. These steps of shipping and storage are represented in the drawing by block 5.

The preparation of the products for the table is very simple, requiring but exposure to a radiant heater, such as an infrared lamp, for about 10–15 minutes, or holding in a conventional oven at 400–450° F. for about 15–20 minutes.

An arrangement for radiant heating is shown in the drawing. Provided in this system are infrared lamps (or burners) 6 and rollers 7, the latter being rotated in the indicated direction by conventional drive means. Potatoes 8, which have been treated as above described, are placed on rollers 7, whereby they are rotated while being exposed to the radiant energy emitted by lamps 6. This rotation is desirable so that all surfaces of the tubers will be exposed to the radiant heat. The heating under these conditions is continued until the skins are crisp and the centers reach a temperature of about 125–136° F. The time required to attain these results will, of course, depend on such factors as the size of the potatoes and the power output of the infrared lamps. In any particular case, the completion of this step can be gauged by such methods as observation, feeling of the potatoes, and use of an insertion-type thermometer. When the potatoes have attained the aforementioned characteristics, they are ready for immediate serving and will be found to taste just like a baked potato prepared by conventional oven-baking technique.

EXAMPLE

The invention is further demonstrated by the following illustrative example.

A batch of Idaho Russet potatoes, each weighing about 200 g., was washed, then cooked in saturated brine (approximately 29% NaCl) at 224° F. for 45 minutes. The cooked potatoes were removed from the brine; their weight loss was found to average 10.8%.

The cooked potatoes were cooled to room temperature, then stored in a refrigerator at 34° F.

After holding at 34° F. for one day, samples of the potatoes were prepared for the table. This was done by rotating them at about 35 r.p.m. on rollers while exposing them to radiant heat from a gas-fired radiant heater held at 5½ inches from the potatoes. After 10 minutes of such irradiation, it was found that the interior temperature of the tubers was 125° F. and the skin was crisp. The heating was discontinued and the products were assessed for taste and texture. It was found that the products had an excellent taste and mealy texture like that of good-quality baked potatoes.

For comparative purposes runs were carried out in which the cooking in brine was replaced by cooking in (a) plain water and (b) with steam under pressure (15 p.s.i.g.). In both of these cases it was found that the end products had a waxy texture typical of boiled potatoes, i.e., they did not have the mealy texture of baked potatoes.

I claim:

1. A process for preparing a potato product which has the characteristic that by subjecting it to radiant or oven heat for a short time, it forms a ready-to-eat dish having the taste and texture of a freshly-prepared baked potato, which comprises:
   (A) cooking raw whole unpeeled potatoes in a saturated aqueous solution of sodium chloride at a temperature of about 215 to 225° F. for a period long enough to gelatinize the starch and to dehydrate the tubers to the extent represented by a loss of about 10% to 18% of their weight,
   (B) cooling the cooked potatoes to about room temperature, then chilling the cooled potatoes to a temperature of about 35–40° F., and holding them at said temperature until they are to be prepared for the table, and
   (C) wherein the potatoes are maintained in a whole unpeeled condition throughout the aforesaid Steps A and B.

2. A process for preparing a potato dish having the taste and texture of a freshly-prepared baked potato which comprises:
   (A) cooking raw, whole, unpeeled potatoes in a bath consisting of water saturated with sodium chloride, the cooking being at a temperature of about 225° F. and for a period long enough to gelatinize the starch and to dehydrate the tubers to the extent represented by a loss of about 10 to 18% of their weight,
   (B) cooling the cooked potatoes to about room temperature,
   (C) chilling the cooled potatoes to a temperature of about 35 to 40° F.,
   (D) enclosing the chilled potatoes in a closed container and maintaining the enclosed contents at a temperature of about 35 to 40° F. while they are subjected to shipping and storage, and
   (E) preparing the aforesaid product for the table by exposing it to radiant or oven heat until the skin is crisp and the interior is about 125–135° F., and
   (F) wherein the potatoes are maintained in a whole, unpeeled condition throughout each of the aforesaid Steps A, B, C, D, and E.

References Cited

UNITED STATES PATENTS 3,394,012    7/1968    Kolton et al. ____ 99—100 P UX

OTHER REFERENCES

Modern Encyclopedia of Cooking, vol. II, Given, p. 1306.
Modern Cook Book, Allen, p. 483.
Good Housekeeping Cookbook, p. 410.

S. LEON BASHORE, Primary Examiner

A. L. CORBIN, Assistant Examiner

U.S. Cl. X.R.

99—193, 207